(12) United States Patent  
Mayo et al.

(10) Patent No.: US 8,959,217 B2  
(45) Date of Patent: Feb. 17, 2015

(54) MANAGING WORKLOADS AND HARDWARE RESOURCES IN A CLOUD RESOURCE

(75) Inventors: Mark G Mayo, Port Moody (CA); James Duncan, Sainte-Anne-des-Lacs (CA); Pedro Palazón Candel, Espinardo (ES); Jason A Hoffman, San Francisco, CA (US); David P Young, San Anselmo, CA (US)

(73) Assignee: Joyent, Inc., San Francisco, CA (US)

( * ) Notice: Subject to any disclaimer, the term of this patent is extended or adjusted under 35 U.S.C. 154(b) by 0 days.

(21) Appl. No.: 12/696,334

(22) Filed: Jan. 29, 2010

(65) Prior Publication Data

US 2011/0179162 A1    Jul. 21, 2011

Related U.S. Application Data

(60) Provisional application No. 61/295,375, filed on Jan. 15, 2010.

(51) Int. Cl.
```
G06F 15/173        (2006.01)
G06F 9/50          (2006.01)
```
(52) U.S. Cl.
CPC .................................. *G06F 9/5077* (2013.01)
USPC ........................................................ 709/226

(58) Field of Classification Search
USPC ........................................................ 709/224
See application file for complete search history.

(56) References Cited

U.S. PATENT DOCUMENTS

| | | | |
|---|---|---|---|
| 6,088,694 A | 7/2000 | Burns et al. | |
| 6,393,495 B1 | 5/2002 | Flory et al. | |
| 6,553,391 B1 | 4/2003 | Goldring et al. | |
| 6,901,594 B1 | 5/2005 | Cain et al. | |
| 7,222,345 B2 | 5/2007 | Gray et al. | |
| 7,265,754 B2 | 9/2007 | Brauss | |

(Continued)

FOREIGN PATENT DOCUMENTS

| | | |
|---|---|---|
| WO | WO 2011/088224 | 7/2011 |
| WO | WO2012125143 | 9/2012 |
| WO | WO2012125144 | 9/2012 |

OTHER PUBLICATIONS

Mayo et al.; "Provisioning Server Resources in a Cloud Resource"; filed Jan. 29, 2010; U.S. Appl. No. 12/696,619.

(Continued)

*Primary Examiner* — Scott Christensen  
(74) *Attorney, Agent, or Firm* — Carr & Ferrell LLP

(57) ABSTRACT

Systems and methods to manage workloads and hardware resources in a data center or cloud. In one embodiment, a method includes a data center having a plurality of servers in a network. The data center provides a virtual machine for each of a plurality of users, each virtual machine to use a portion of hardware resources of the data center. The hardware resources include storage and processing resources distributed onto each of the plurality of servers. The method further includes sending messages amongst the servers, some of the messages being sent from a server including status information regarding a hardware resource utilization status of that server. The method further includes detecting a request from the virtual machine to handle a workload requiring increased use of the hardware resources, and provisioning the servers to temporarily allocate additional resources to the virtual machine, wherein the provisioning is based on status information provided by one or more of the messages.

24 Claims, 7 Drawing Sheets

(56) References Cited

U.S. PATENT DOCUMENTS

| | | |
|---|---|---|
| 7,379,994 B2 | 5/2008 | Collazo |
| 7,437,730 B2 | 10/2008 | Goyal |
| 7,529,780 B1 | 5/2009 | Braginsky et al. |
| 7,581,219 B2 | 8/2009 | Neiger et al. |
| 7,603,671 B2 | 10/2009 | Liu |
| 7,640,547 B2 | 12/2009 | Neiman et al. |
| 7,685,148 B2 | 3/2010 | Engquist et al. |
| 7,774,457 B1 | 8/2010 | Talwar et al. |
| 7,814,465 B2 | 10/2010 | Liu |
| 7,849,111 B2 | 12/2010 | Huffman et al. |
| 7,899,901 B1 | 3/2011 | Njemanze et al. |
| 7,904,540 B2* | 3/2011 | Hadad et al. ............ 709/223 |
| 7,917,599 B2 | 3/2011 | Gopalan et al. |
| 7,933,870 B1 | 4/2011 | Webster |
| 7,940,271 B2 | 5/2011 | Wright et al. |
| 8,006,079 B2 | 8/2011 | Goodson et al. |
| 8,010,498 B2 | 8/2011 | Gounares et al. |
| 8,141,090 B1 | 3/2012 | Graupner et al. |
| 8,181,182 B1 | 5/2012 | Martin |
| 8,244,559 B2 | 8/2012 | Horvitz et al. |
| 8,301,746 B2 | 10/2012 | Head et al. |
| 8,336,051 B2 | 12/2012 | Gokulakannan |
| 8,346,935 B2 | 1/2013 | Mayo et al. |
| 8,370,936 B2 | 2/2013 | Zuk et al. |
| 8,417,673 B2 | 4/2013 | Stakutis et al. |
| 8,417,746 B1 | 4/2013 | Gillett, Jr. et al. |
| 8,429,282 B1 | 4/2013 | Ahuja et al. |
| 8,434,081 B2 | 4/2013 | Cervantes et al. |
| 8,464,251 B2 | 6/2013 | Sahita et al. |
| 8,468,251 B1 | 6/2013 | Pijewski et al. |
| 8,547,379 B2 | 10/2013 | Pacheco et al. |
| 8,555,276 B2 | 10/2013 | Hoffman et al. |
| 8,631,131 B2 | 1/2014 | Kenneth et al. |
| 8,677,359 B1 | 3/2014 | Cavage et al. |
| 8,775,485 B1 | 7/2014 | Cavage et al. |
| 8,782,224 B2 | 7/2014 | Pijewski et al. |
| 8,789,050 B2 | 7/2014 | Hoffman et al. |
| 8,793,688 B1 | 7/2014 | Mustacchi et al. |
| 8,826,279 B1 | 9/2014 | Pacheco et al. |
| 8,881,279 B2 | 11/2014 | Gregg |
| 8,898,205 B2 | 11/2014 | Cavage et al. |
| 2002/0069356 A1 | 6/2002 | Kim |
| 2002/0082856 A1 | 6/2002 | Gray et al. |
| 2002/0156767 A1 | 10/2002 | Costa et al. |
| 2002/0198995 A1 | 12/2002 | Liu et al. |
| 2003/0154112 A1 | 8/2003 | Neiman et al. |
| 2003/0163596 A1 | 8/2003 | Halter et al. |
| 2004/0088293 A1 | 5/2004 | Daggett |
| 2005/0097514 A1 | 5/2005 | Nuss |
| 2005/0108712 A1 | 5/2005 | Goyal |
| 2005/0188075 A1 | 8/2005 | Dias et al. |
| 2006/0107087 A1* | 5/2006 | Sieroka et al. ............ 714/4 |
| 2006/0153174 A1 | 7/2006 | Towns-von Stauber et al. |
| 2006/0218285 A1 | 9/2006 | Talwar et al. |
| 2006/0246879 A1 | 11/2006 | Miller et al. |
| 2006/0248294 A1 | 11/2006 | Nedved et al. |
| 2006/0294579 A1 | 12/2006 | Khuti et al. |
| 2007/0088703 A1 | 4/2007 | Kasiolas et al. |
| 2007/0118653 A1 | 5/2007 | Bindal |
| 2007/0168336 A1 | 7/2007 | Ransil et al. |
| 2007/0179955 A1 | 8/2007 | Croft et al. |
| 2007/0250838 A1 | 10/2007 | Belady et al. |
| 2007/0271570 A1 | 11/2007 | Brown et al. |
| 2008/0080396 A1* | 4/2008 | Meijer et al. ............ 370/254 |
| 2008/0103861 A1 | 5/2008 | Zhong |
| 2008/0155110 A1 | 6/2008 | Morris |
| 2009/0044188 A1 | 2/2009 | Kanai et al. |
| 2009/0077235 A1 | 3/2009 | Podila |
| 2009/0092124 A1 | 4/2009 | Singhal et al. |
| 2009/0164990 A1 | 6/2009 | Ben-Yehuda et al. |
| 2009/0172051 A1 | 7/2009 | Huffman et al. |
| 2009/0193410 A1 | 7/2009 | Arthursson et al. |
| 2009/0216910 A1* | 8/2009 | Duchesneau ............ 709/250 |
| 2009/0259345 A1 | 10/2009 | Kato et al. |
| 2009/0260007 A1 | 10/2009 | Beaty et al. |
| 2009/0300210 A1* | 12/2009 | Ferris ............ 709/235 |
| 2010/0050172 A1* | 2/2010 | Ferris ............ 718/1 |
| 2010/0057913 A1 | 3/2010 | DeHaan |
| 2010/0106820 A1 | 4/2010 | Gulati et al. |
| 2010/0114825 A1 | 5/2010 | Siddegowda |
| 2010/0125845 A1 | 5/2010 | Sugumar et al. |
| 2010/0131324 A1 | 5/2010 | Ferris |
| 2010/0131854 A1 | 5/2010 | Little |
| 2010/0153958 A1 | 6/2010 | Richards et al. |
| 2010/0162259 A1 | 6/2010 | Koh et al. |
| 2010/0223383 A1* | 9/2010 | Salevan et al. ............ 709/226 |
| 2010/0223385 A1 | 9/2010 | Gulley et al. |
| 2010/0228936 A1 | 9/2010 | Wright et al. |
| 2010/0235632 A1 | 9/2010 | Iyengar et al. |
| 2010/0250744 A1 | 9/2010 | Hadad et al. |
| 2010/0262752 A1 | 10/2010 | Davis et al. |
| 2010/0268764 A1 | 10/2010 | Wee et al. |
| 2010/0299313 A1* | 11/2010 | Orsini et al. ............ 707/652 |
| 2010/0306765 A1 | 12/2010 | DeHaan |
| 2010/0306767 A1 | 12/2010 | Dehaan |
| 2010/0318609 A1 | 12/2010 | Lahiri et al. |
| 2010/0332262 A1 | 12/2010 | Horvitz et al. |
| 2010/0332629 A1 | 12/2010 | Cotugno et al. |
| 2010/0333087 A1 | 12/2010 | Vaidyanathan et al. |
| 2011/0004566 A1 | 1/2011 | Berkowitz et al. |
| 2011/0016214 A1 | 1/2011 | Jackson |
| 2011/0029969 A1 | 2/2011 | Venkataraja et al. |
| 2011/0029970 A1 | 2/2011 | Arasaratnam |
| 2011/0047315 A1 | 2/2011 | De Dinechin et al. |
| 2011/0055377 A1 | 3/2011 | DeHaan |
| 2011/0055396 A1 | 3/2011 | DeHaan |
| 2011/0055398 A1 | 3/2011 | DeHaan et al. |
| 2011/0078303 A1 | 3/2011 | Li et al. |
| 2011/0107332 A1 | 5/2011 | Bash |
| 2011/0131306 A1 | 6/2011 | Ferris et al. |
| 2011/0131329 A1 | 6/2011 | Kaplinger et al. |
| 2011/0131589 A1 | 6/2011 | Beaty et al. |
| 2011/0138382 A1 | 6/2011 | Hauser et al. |
| 2011/0138441 A1 | 6/2011 | Neystadt et al. |
| 2011/0145392 A1 | 6/2011 | Dawson et al. |
| 2011/0153724 A1 | 6/2011 | Raja et al. |
| 2011/0161952 A1 | 6/2011 | Poddar et al. |
| 2011/0173470 A1 | 7/2011 | Tran |
| 2011/0179132 A1* | 7/2011 | Mayo et al. ............ 709/213 |
| 2011/0179134 A1 | 7/2011 | Mayo et al. |
| 2011/0185063 A1 | 7/2011 | Head et al. |
| 2011/0219372 A1 | 9/2011 | Agrawal et al. |
| 2011/0270968 A1 | 11/2011 | Salsburg et al. |
| 2011/0276951 A1 | 11/2011 | Jain |
| 2011/0296021 A1 | 12/2011 | Dorai et al. |
| 2011/0302378 A1 | 12/2011 | Siebert |
| 2011/0302583 A1 | 12/2011 | Abadi et al. |
| 2011/0320520 A1 | 12/2011 | Jain |
| 2012/0017210 A1 | 1/2012 | Huggins et al. |
| 2012/0054742 A1 | 3/2012 | Eremenko et al. |
| 2012/0060172 A1 | 3/2012 | Abouzour |
| 2012/0066682 A1 | 3/2012 | Al-Aziz et al. |
| 2012/0079480 A1 | 3/2012 | Liu |
| 2012/0089980 A1 | 4/2012 | Sharp et al. |
| 2012/0124211 A1 | 5/2012 | Kampas et al. |
| 2012/0131156 A1 | 5/2012 | Brandt et al. |
| 2012/0131591 A1 | 5/2012 | Moorthi et al. |
| 2012/0159507 A1 | 6/2012 | Kwon et al. |
| 2012/0167081 A1 | 6/2012 | Sedayao et al. |
| 2012/0173709 A1 | 7/2012 | Li et al. |
| 2012/0179874 A1 | 7/2012 | Chang et al. |
| 2012/0185913 A1 | 7/2012 | Martinez et al. |
| 2012/0198442 A1 | 8/2012 | Kashyap et al. |
| 2012/0204176 A1 | 8/2012 | Tian et al. |
| 2012/0221845 A1 | 8/2012 | Ferris |
| 2012/0233315 A1 | 9/2012 | Hoffman et al. |
| 2012/0233626 A1 | 9/2012 | Hoffman et al. |
| 2012/0246517 A1 | 9/2012 | Bender et al. |
| 2012/0266231 A1 | 10/2012 | Spiers et al. |
| 2012/0284714 A1 | 11/2012 | Venkitachalam et al. |
| 2012/0303773 A1 | 11/2012 | Rodrigues |
| 2012/0311012 A1 | 12/2012 | Mazhar et al. |
| 2013/0042115 A1 | 2/2013 | Sweet et al. |
| 2013/0060946 A1 | 3/2013 | Kenneth et al. |

(56) References Cited

U.S. PATENT DOCUMENTS

| | | |
|---|---|---|
| 2013/0067067 A1 | 3/2013 | Miri et al. |
| 2013/0081016 A1 | 3/2013 | Saito et al. |
| 2013/0086590 A1 | 4/2013 | Morris et al. |
| 2013/0129068 A1 | 5/2013 | Lawson et al. |
| 2013/0132057 A1 | 5/2013 | Deng et al. |
| 2013/0169666 A1 | 7/2013 | Pacheco et al. |
| 2013/0173803 A1 | 7/2013 | Pijewski et al. |
| 2013/0179881 A1 | 7/2013 | Calder et al. |
| 2013/0191835 A1 | 7/2013 | Araki |
| 2013/0191836 A1 | 7/2013 | Meyer |
| 2013/0254407 A1 | 9/2013 | Pijewski et al. |
| 2013/0318525 A1 | 11/2013 | Palanisamy et al. |
| 2013/0328909 A1 | 12/2013 | Pacheco et al. |
| 2013/0339966 A1 | 12/2013 | Meng et al. |
| 2013/0346974 A1 | 12/2013 | Hoffman et al. |
| 2014/0279955 A1 | 9/2014 | Cavage et al. |
| 2014/0280198 A1 | 9/2014 | Cavage et al. |
| 2014/0280796 A1 | 9/2014 | Pijewski |
| 2014/0280912 A1 | 9/2014 | Gregg |
| 2014/0280970 A1 | 9/2014 | Pijewski et al. |
| 2014/0281304 A1 | 9/2014 | Hoffman |
| 2014/0282512 A1 | 9/2014 | Pacheco et al. |
| 2014/0282513 A1 | 9/2014 | Pacheco et al. |
| 2014/0282590 A1 | 9/2014 | Cavage et al. |
| 2014/0282615 A1 | 9/2014 | Cavage et al. |
| 2014/0283053 A1 | 9/2014 | Gregg |

OTHER PUBLICATIONS

Mayo et al.; "Managing Hardware Resources by Sending Messages Amongst Servers in a Data Center"; filed Jan. 29, 2010; U.S. Appl. No. 12/696,802.

Kramer, "Advanced Message Queuing Protocol (AMQP)," Linux Journal, Nov. 2009, p. 1-3.

Subramoni et al., "Design and Evaluation of Benchmarks for Financial Applications Using Advanced Message Queuing Protocol (AMQP) over InfiniBand," Nov. 2008.

Richardson et al., "Introduction to RabbitMQ," Sep. 2008, p. 1-33.

Bernstein et al., "Using XMPP as a Transport in Intercloud Protocols," Jun. 22, 2010, p. 1-8.

Bernstein et al., "Blueprint for the Intercloud—Protocols and Formats for Cloud Computing Interoperabiilty," May 28, 2009, p. 328-336.

Gregg, Brendan, "Visualizing System Latency," May 1, 2010, ACM Queue, p. 1-13, http://queue.acm.org/detail.cfm?id=1809426.

Gregg, Brendan, "Heat Map Analytics," Mar. 17, 2009, Oracle, p. 1-7, https://blogs.oracle.com/brendan/entry/heat_map_analytics.

Mundigl, Robert, "There is More Than One Way to Heat a Map," Feb. 10, 2009, Clearly and Simply, p. 1-12, http://www.clearlyandsimply.com/clearly_and_simply/2009/02/there-is-more-than-one-way-to-heat-a-map.html.

Yagoubi, Belabbas et al., "Load Balancing in Grid Computing," Asian Journal of Information Technology, vol. 5, No. 10, pp. 1095-1103, 2006. (Joyent_NPL0001).

Chef Documents. Retrieved Mar. 11, 2014 from http://docs.opscode.com/.

Ansible Documentation. Retrieved Mar. 11, 2014 from http://docs.ansible.com/.

Bill Pijewski's Blog. Retrieved Mar. 12, 2014 from http://dtrace.org/blogs/wdp/2011/03/our-zfs-io-throttle/.

Brendan's Blog. Retrieved Mar. 12, 2014 from http://dtrace.org/blogs/brendan/2011/03/08/busy-week-zfs-throttling-dtrace-node-js-and-cloud-analytics/.

Joyent ZFS Performance Analysis and Tools. Retrieved Mar. 12, 2014 from http://www.slideshare.net/brendangregg/zfsperftools2012.

Block IO Controller. Retrieved Mar. 12, 2014 from https://www.kernel.org/doc/Documentation/cgroups/blkio-controller.txt.

Block Device Bio Throttling Support. Retrieved Mar. 12, 2014 from https://lwn.net/Articles/403889/.

Gregg, Brendan. Systems Performance: Enterprise and the Cloud, Prentice Hall, 2014, pp. 557-558.

International Search Report and Written Opinion of the International Searching Authority mailed Sep. 1, 2011 in Patent Cooperation Treaty Application No. PCT/US2011/021157 filed Jan. 13, 2011.

International Search Report and Written Opinion of the International Searching Authority mailed May 19, 2011 in Patent Cooperation Treaty Application No. PCT/US2011/028234 filed Mar. 11, 2011.

Mesnier, Michael. I/O throttling. 2006. Retrieved Apr. 13, 2014 from https://www.usenix.org/legacy/event/fast07/tech/full_papers/mesnier/mesnier_html/node5.html.

International Search Report and Written Opinion of the International Searching Authority mailed May 5, 2011 in Patent Cooperation Treaty Application No. PCT/US2011/028230, filed Mar. 12, 2011.

Bi et al. "Dynamic Provisioning Modeling for Virtualized Multi-tier Applications in Cloud Data Center". 2010 IEEE 3rd International Conference on Cloud Computing. pp. 370-377.

Chappell, David. "Introducing Windows Azure". Microsoft Corporation. Oct. 2010. pp. 1-25.

\* cited by examiner

MANAGING WORKLOADS AND HARDWARE RESOURCES IN A CLOUD RESOURCE

RELATED APPLICATIONS

This application claims priority to U.S. Provisional Patent Application No. 61/295,375, filed Jan. 15, 2010 (titled MANAGING WORKLOADS AND HARDWARE RESOURCES IN A CLOUD RESOURCE by Mark G. Mayo et al.), the contents of which is incorporated herein by reference in its entirety.

FIELD OF THE TECHNOLOGY

At least some embodiments disclosed herein relate to computer networks in general, and more particularly, but not limited to, managing hardware resources in a data center or cloud resource.

BACKGROUND

A cloud is a resource that typically combines the computational power of a large grouping of processors and/or that combines the storage capacity of a large grouping of computer memories or storage devices. For example, systems that provide a cloud resource may be utilized exclusively by their owners, such as Google or Yahoo; or such systems may be accessible to outside users who deploy applications within the computing infrastructure to obtain the benefit of large computational or storage resources.

The cloud may be formed, for example, by a network of servers with each server providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
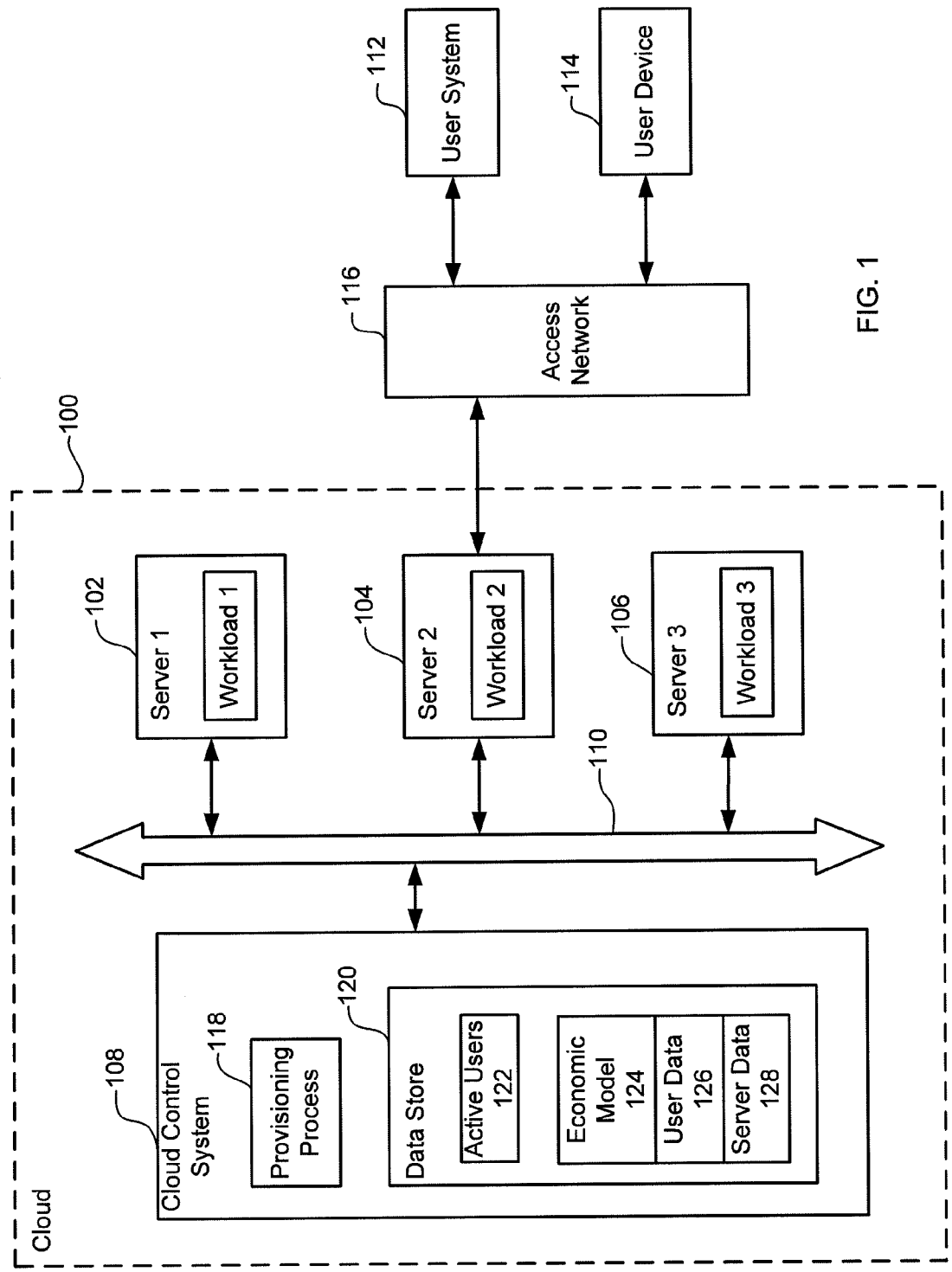
FIG. 1 shows a data center or cloud including servers and a cloud control system according to one embodiment.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

As used herein, "virtual machine" generally means a functional operating environment that exists within an operating system responsible for managing the physical hardware. Examples of a virtual machine include Solaris Zones, FreeBSD jails, Linux KVMs, Citrix Xen, VMware ESX VMs, and Joyent Accelerators.

Systems and methods to manage resources in a data center (e.g., a cloud) are described herein. In one embodiment, a data center has a plurality of servers in a network. The data center provides a virtual machine for each of a plurality of users (e.g., customers of a cloud vendor), with each virtual machine to use a portion of hardware resources of the data center. The hardware resources include storage and processing resources distributed across the various servers in the data center. This distribution may not be uniform, and the servers may vary significantly in performance.

Each server communicates via one or more messaging systems in a cloud control system for the data center. The above method further includes sending messages amongst the servers, some of the messages being sent from a server including status information regarding a hardware resource utilization status of that server. The method further includes detecting a request from the virtual machine to handle a workload requiring increased use of the hardware resources, and provisioning the servers to temporarily allocate additional resources to the virtual machine. This provisioning is based on status information provided by one or more of the messages. An increased use of the hardware is required, for example, when a cloud customer may have a temporary increased number or spike of visitors to a website of the customer that is running on the customer's virtual machine in the cloud.

The disclosure includes methods and apparatuses which perform these methods, including data centers, clouds, or other data processing systems which perform these methods, and computer readable media containing instructions which when executed on data processing systems cause the systems to perform these methods. Various embodiments are described below in which processing, storage, and/or other resources of servers in the network are monitored, managed and/or provisioned to operate a data center, for example, having multiple users with unpredictably varying computing demands. Other features will be apparent from the accompanying drawings and from the detailed description which follows below.

FIG. 1 shows a data center or cloud 100 including servers 102, 104, and 106 (also designated as Servers 1, 2, and 3), and a cloud control system 108 according to one embodiment. Cloud 100 manages the hardware resources (e.g., processor, memory, and/or storage space) of servers coupled by network 110 (e.g., a local-area or other data network) or otherwise.

Customers or users of cloud 100 may access the services of the cloud via a user system 112 (e.g., a website server) or user device 114 (e.g., a phone or PDA) running an application program interface (API). User system 112 and user device 114 couple to cloud 100 using an access network 116 (e.g., the Internet or other telecommunications network). Access network 116 may communicate, for example directly with server 104 or with another computing device in cloud control system 108.

Each of many potential customers (e.g., hundreds or thousands) may configure one or more virtual machines to run in cloud 100. Each virtual machine runs one or many processing workloads of a customer (e.g., serving of a website, etc.), which places processing and other demands on the resources of cloud 100. For example, Server 1 handles processing for a Workload 1, as illustrated in FIG. 1.

For example, a user may access cloud 100 by going to a website and ordering a virtual machine, which is then provisioned by cloud control system 108. Then, the user has a private API that exists on all of their services. This will be made public to the customers of the user, and the user can use an API to interact with the infrastructure. Every system may have a "public" interface, a private interface, an administrative interface and a storage interface. This is reflected, for example, from switch to port to NIC to physical interface to logical interface to virtual interface.

Each virtual machine uses a portion of the hardware resources of cloud 100. These hardware resources include storage and processing resources distributed onto each of the plurality of servers, and these resources are provisioned to handle the virtual machines as minimally specified by a user. Cloud control system 108 dynamically provisions the hardware resources of the servers in the cloud during operation as the cloud handles varying customer workload demands. Cloud control system 108 may be implemented on many different types of computing devices, such as dedicated hardware platform(s) and/or distributed across many physical nodes. Some of these physical nodes may include, for example, one or more of the servers 102, 104, and 106 or other servers in cloud 100.

A plurality of messages are sent amongst Servers 1, 2, and 3 (and, for example, potentially hundreds of other servers). These messages may be sent within a messaging architecture of cloud 100 (e.g., controlled by cloud control system 108), as described further below. A portion of the messages sent from any given server include status information regarding a hardware resource utilization status of that server. Cloud control system 108 analyzes this information and uses decision-making logic (e.g., decision engines) to implement resource provisioning changes as workload demands may vary. These provisioning changes may be implemented by a partitioning process running on each server in cloud 100.

Cloud control system 108 detects a request from a first virtual machine of a customer to handle a workload requiring increased use of the hardware resources in the cloud 100 (e.g., a significant, but only temporary, increase in data input/output (I/O) to hard drive or other memory storage in cloud 100). This increased demand often may impact handling of workloads for other customers.

Cloud control system 108 assesses the overall status of the cloud resources (e.g., extent of current utilization as required by workloads for the various virtual machines of the cloud customers), and uses one or more decision engines to implement provisioning changes. This may be done by provisioning the servers (e.g., by a provisioning process 118) to temporarily allocate additional hardware resources on one or more servers in cloud 100 to the first virtual machine. This provisioning may be based in part on status information provided by one or more messages received by cloud control system 108. For example, if workloads for virtual machines of other users are only placing low demands on the cloud 100, then cloud control system 108 may send out one or more messages to shift or allocate more resources to the high-demand workload.

Cloud control system 108 includes data store 120 (e.g., one or more database (DB) servers). Data store 120 may store information regarding active users 122 of the cloud. Data store 120 may further store information used by the decision-making logic or engines when making provisioning changes including an economic model 124 (e.g., regarding the cost of various hardware resources), historical user data 126 (e.g., regarding prior workload characteristics and demands as observed in cloud 100), and server data 128 (e.g., regarding resource utilization data, past and/or present, for the servers in the cloud). In one embodiment, the information in data store 120 has been communicated by messages received from the servers in cloud 100.

In one embodiment, economic model 124 may associate an economic value to the storage and processing resources. The provisioning to allocate additional resources to a virtual machine may be based at least in part on the economic value associated with the storage or processing resources that are available for use by the virtual machine.

In another embodiment, each of a plurality of workloads corresponds to one of a plurality of users of the data center. User data is stored for each respective user, and the user data includes data regarding behavior of prior workloads handled by the data center for the respective user. The provisioning of the servers to temporarily allocate additional resources to a workload includes correlating system calls for a server to user data for a user having a workload being handled by the server.

In one embodiment, a plurality of workloads being handled by a plurality of servers in cloud 100 are monitored, with each server providing one or more shared hardware resources for cloud 100, and each of the workloads uses at least one of these shared hardware resources. Workload 1 is using a first shared hardware resource of Server 1.

Cloud control system 108 detects a high demand placed by Workload 1 upon Server 1. This high demand may be determined to exist when its demand is greater than an average demand of other workloads being handled by the Server 1. In response to detecting this high demand, a message is sent by system 108 commanding, e.g., Server 1 to move the Workload 1 from the first shared hardware resource to a dedicated hardware resource of Server 1.

The monitoring of the workloads above may include executing one or more agents on each of the servers in cloud 100. One agent may include a process that monitors utilization of system resources on Server 1, and the agent reports server utilization data to cloud control system 108 using one or more messages in the messaging system described herein. The decision by a decision engine to move Workload 1 to a dedicated hardware resource may be at least in part based on economic model 124 and/or on an analysis of server resource data (e.g., server data 128) and historical user data 126.

In one embodiment, in cloud 100 users or customers are the top level of the networking namespace. The activities are segmented into administrative and data networks (not accessible by the customers), and both public and constrained private networks are provided to the customers. The network stacks are locked down so they cannot be modified within a virtual machine, they cannot spoof MAC addresses, and they cannot sniff networking traffic.

In one embodiment, the management of resources in cloud 100 may be viewed as the management of compute, networking and data resources, which may be broken down and viewed as three "commodities" and three "utilities" to be managed. The three commodities are memory space, processor space, storage device (e.g., disk) space, and the three utilities are memory I/O, network I/O and storage device I/O. One of the more significant capacity-planning commodities is memory space, and processor space is configured to fluctuate according to a fair share scheduler and reasonable CPU caps with the persistent option of the assignment of single or multiple processing cores to a given virtual machine or workload. Use, for example, of a Unix system distribution allows large 64-bit memory spaces to be addressed (note in contrast that a 32-bit OS can only address ≤4 GB of memory).

In alternative embodiments, the provisioning and shifting of a workload by cloud control system 108 may shift the workload from a first shared resource to a second shared resource. In this alternative embodiment, it is not required that the workload be shifted to a dedicated resource. Cloud control system 108 may be generally used for provisioning resource demands by workloads, including in some embodiments the provisioning of only shared hardware resources.

Figure 2:
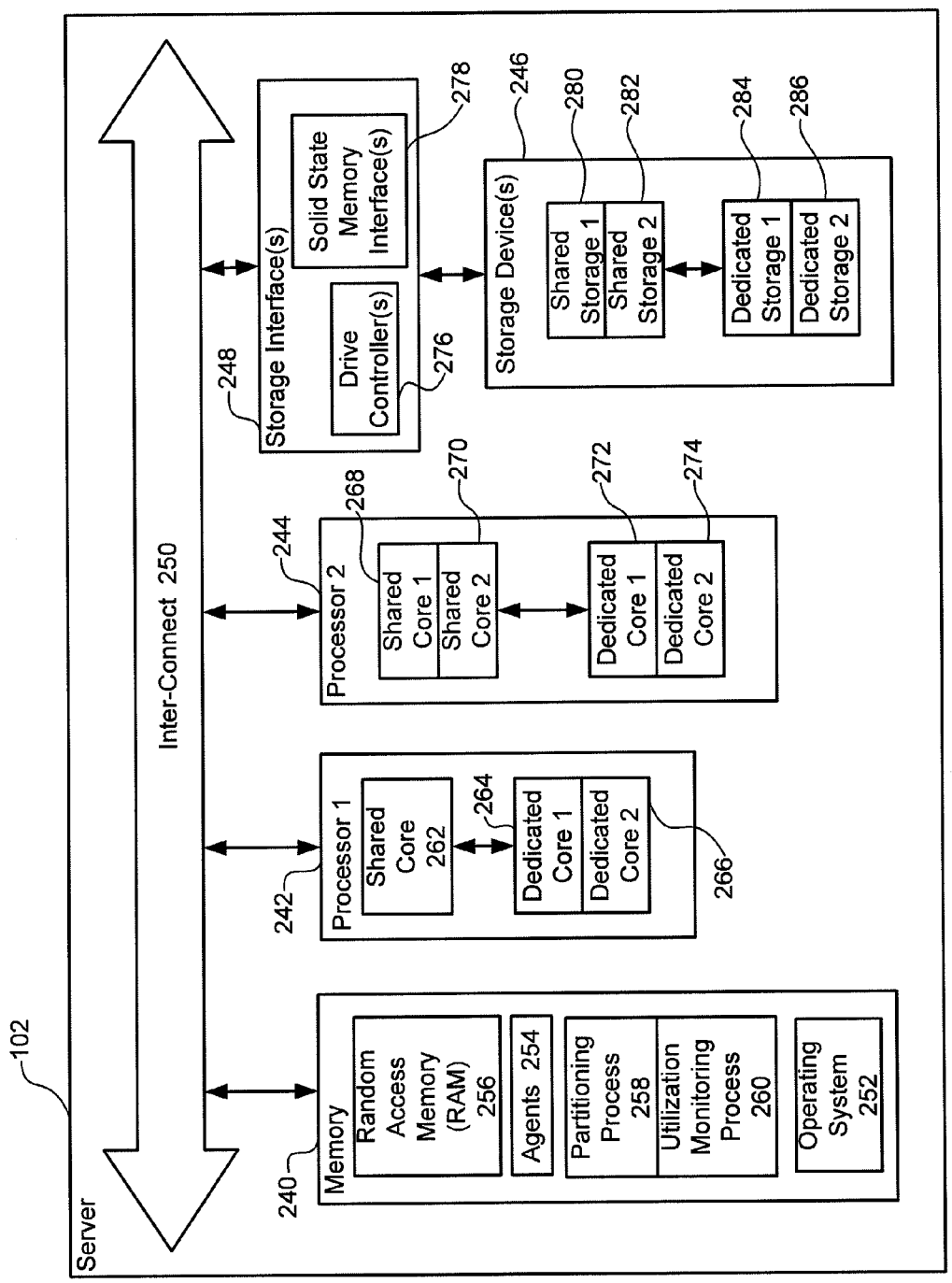
FIG. 2 shows a server in the data center of FIG. 1 according to one embodiment.

FIG. 2 shows Server 1 (i.e., server 102) of data center 100 in more detail according to one embodiment. Server 102 includes memory 240, physical processors 242 and 244, and one or more storage devices 246 (e.g., one or more hard drives or solid state drives), each of which may be coupled for internal data communications by inter-connect 250 (e.g., an internal system bus). Storage device 246 may be coupled to inter-connect 250 by one or more storage interfaces 248, which may include, for example, drive controller(s) 276 and/or solid state memory interface(s) 278.

Storage device 246 may be partitioned into shared and dedicated storage spaces. These may include shared storage spaces 280, 282 and dedicated storage spaces 284, 286. These shared storage spaces, in this embodiment, handle storage needs for several workloads that are running in cloud 100 (e.g., in one or more virtual machines of customers). If a high demand for storage capacity is detected for any given one of these workloads, then one or more of dedicated storage spaces 284 and 286 may be used to temporarily handle the storage resource needs for the high demand workload. In one embodiment, the storage needs for the workload are completely shifted to a dedicated storage resource (e.g., to avoid interfering with handling of storage needs for other workloads being handled by storage device(s) 246).

In one embodiment, the storage of files in a storage device 246 is handled by a file system (e.g., the ZFS file system designed by Sun Microsystems using a multithreaded ZFS send-receive). More specifically, provisioning the servers to temporarily allocate additional storage resources to a first workload includes moving the first workload from a shared storage resource to a dedicated storage resource of a first server of the plurality of servers by specifying to the file system for the storage device that data storage for the first workload is to be handled by the dedicated storage resource (e.g., a dedicated logical SSD). The file system may be programmed from an API running on a user's computing device.

In another embodiment, the shared storage resource is a first pool under the file system within which a plurality of virtual machines of other users are running, and the dedicated storage resource is a second pool under the file system. The second pool stores at least a portion of files associated with the first workload prior to moving the first workload to the dedicated storage resource. As an example, the first pool includes at least four drives in a RAID configuration, the second pool comprises at least two drives, and the second pool is operating as a mirror of the first pool. The file system may provide a combined file system and logical volume manager that implements snapshots. In one embodiment, the file system is the ZFS file system, and each server in cloud 100 uses the ZFS file system.

As a specific example in one embodiment, the file system can function like a RAID card and comparably implement the same functionality with a key difference: data center 100 is configured so that the file system may be accessed programmatically. The file system can, for example, see 12 drives. The drives within the file system can be arranged in pools. For example, eight drives can be put into a single pool that is implemented in a RAID configuration. Then, two drives can be put into a mirror, and another two drives can be put into a mirror.

A virtual machine (sometimes referred to herein as an "accelerator") is itself supported by a storage pool/file system. The virtual machine is on a file system on one of these pools. For example, the eight drive pool has eight virtual machines running on it and each one is a file system within that pool on those eight drives, and one customer's file workload has been identified to be significantly impacting the other workloads in that pool.

Here, the eight drives are formed together into a pool. There are another two spindles that are formed together into their own pool and they are mirrored across. The file system that is in pool number one is shifted to pool number two. This is treated like the copying of the file system from one place to another, but here the file system completely encapsulates a bootable virtual machine. After shifting, the file system is the only file system on pool two (e.g., having two spindles). Each storage pool can be bound to a particular pool. This type of scheduling can occur without having to reconfigure the underlying pools.

In one embodiment, the RAID structure (e.g., the equivalent of RAID1 or RAID6) is implemented in software rather than in hardware. This permits the RAID structure to be accessed and re-programmed without the use of hardware cards.

Memory 240 corresponds to system memory for server 102. The system memory is addressed by physical processors 242 and 244. Memory 240 typically includes, for example, random access memory 256 (e.g., DRAM and/or SRAM). As discussed above, one or more software agents 254 may be executing on server 102. These agents may include partitioning process 258 and utilization monitoring process 260. Memory 240 also typically includes an operating system 252 (e.g., the Solaris OS from Sun Microsystems).

Processor 242 includes a shared core 262 and also dedicated cores 264, 266. The shared and dedicated cores each provide a logical processor for physical processor 242. If simultaneous multi-threading is, for example, used by the processor (e.g., Hyper-threading for Intel Corporation microprocessors), then each core provides two logical processors.

Typically, during operation of cloud 100, numerous workloads share processing capacity available from shared core 262. If a workload has a high demand for processing capacity, then processing needs for that workload may be shifted by cloud control system 108 to, for example, dedicated core 264. This shifting may be implemented, for example, by partitioning process 258, which itself responds to a command in one or more messages from cloud control system 108. Utilization monitoring process 260 may periodically send messages to cloud control system 108 to report metrics on the utilization by server 102 of memory, processing, and/or storage capacity (e.g., the demand on storage device(s) 246).

Processor 244 includes shared cores 268, 270 and dedicated cores 272, 274. Similarly as described above, a high demand workload may be shifted from one of these shared cores to one or more dedicated cores (e.g., as determined by information in messages to cloud control system 108). Further, cloud control system 108, may direct the provisioning of dedicated cores from processor 242 similarly as described above. Also, shared or dedicated processor cores from other servers in cloud 100 may be used to support the high demand workload.

In one embodiment, each server in cloud 100 has one or more physical processors providing a plurality of logical processors including a shared logical processor and a dedicated logical processor. The dedicated logical processor is configured to operate as a dedicated hardware resource. Each server has system memory accessible by each of the logical processors, and the system memory size is at least four gigabytes of memory for each logical processor in the server. The server further has a storage device configured to operate as a dedicated hardware resource.

In another embodiment, each respective server of cloud 100 includes at least one physical processor providing four or more processing cores, with each core using simultaneous multithreading. Each server includes a system memory size of at least eight gigabytes of memory for each processing core, and each server includes at least one hard disk drive (HDD) having a portion configured to provide a shared storage resource. Each server also includes at least one solid state drive (SSD) having a portion configured to provide a dedicated storage resource. In this embodiment, the SSD capacity is at least 35 percent of the HDD capacity, and the total memory size of the system memory is at least ten percent of the combined HDD capacity and SSD capacity.

In one embodiment, a server may shift a workload from a shared core to a dedicated core. The concepts of a processor (CPU) under a fair share scheduler are coordinated with a cap, as well the ability to dedicate a specific CPU for the sole use of a virtual machine. The flow is to put a virtual machine under a "share cap" that is, for example, 95% of the CPU resources available and then a share. That share could be expanded to consume an entire CPU as a minimum guarantee, and then the processes in that virtual machine can be instructed to either float that share across multiple logical processors or only be executed on one processor.

Cloud control system 108 also in general may monitor input/output rates for each server regarding high demand I/O rates placed by a workload on system memory I/O, storage device I/O, and network I/O. These I/O rates may be communicated by messages within cloud control system 108 as discussed below.

In one embodiment, each storage device (e.g., each SSD) has a data input/output rate of at least ten megabytes per second for each gigabyte of system memory. For example, each server may have at least one physical processor providing four or more processing cores, system memory of at least four gigabytes of memory for each processing core, and at least one solid state drive (SSD) having at least a portion configured to provide the dedicated storage resource. Each SSD has a data input/output rate of at least ten megabytes per second for each gigabyte of system memory.

In another embodiment, each server has a hard disk drive (HDD) to provide shared hardware resources, and an SSD including at least five logical drives configured to shift back-and-forth between operation as a shared resource or as a dedicated resource as requested during operation of cloud 100.

In yet another embodiment, each server has a plurality of logical SSDs, with each drive being individually addressable by a virtual machine supported by the server. The provisioning to allocate additional resources includes allocating at least one of the logical SSDs to the respective virtual machine.

With regard to server design and selecting a memory-to-core ratio for use in one embodiment, most CPUs have an inherent bus speed and memory pipe size. Other considerations are closely spaced memory in a dense environment and heat considerations. Also, cost considerations are relevant to the memory-to-core ratio. The ratio may be expressed as gigabytes (GB) of RAM per logical CPU or as GB of RAM per physical CPU (e.g., four gigabytes of RAM per logical CPU, or relative to a core with Hyper-threading, eight gigabytes of RAM per core). With a server having one socket, this is one physical CPU. One socket can have, for example, four cores. The four cores in the system are recognized as eight logical CPUs. As the internal bus speed increases, it is typically preferred to have more memory per logical CPU.

With regard to the I/O rate for the storage devices relative to the system memory capacity on a sever in one embodiment, the minimum ratio is about 10 megabytes per second per one gigabyte of system memory. It is typically desirable that this rate be greater than this. For operation below this ratio, for example if an application is heavily processing a database, then there is typically some deadlocking of files on the disk or other storage device. From observation, an unexpected result is that this deadlocking is not merely a gradual degradation, in which the handling of other workloads on the server becomes slower. Instead, the handling of these workloads tends to substantially stop working effectively as needed to meet user or customer real-time processing needs.

The use of various storage devices (e.g., SSD vs. hard drive) in one embodiment does not affect the above minimum ratio. Each SSD and hard drive has a different I/O rate. An SSD may have a rate of 180 megabytes per second. In contrast, a hard drive may have a rate of 40 megabytes per second. So, there are different rates per storage device (e.g., hard drive spindle) with different latency and access speeds.

The foregoing is generally the same whether non-volatile RAM or flash memory-based RAM is used. SSDs are typically flash memory-based, but are used in the same profile as a hard drive. For example, a four-tiered "memory" system may be used with a range of persistent and performance states: traditional DRAM, flash card non-volatile RAM (e.g., "SSD" in a "RAM" form factor), SSD with an SAS/SATA form factor/interface, and actual SAS/SATA drives.

So, for example, if a socket on a server has eight or 16 cores, and the server has 128 or 512 gigabytes of RAM, then, the server may need to use SSD or flash memory in order to maintain the 10 megabytes per second I/O per gigabyte of RAM minimum ratio. With Hyper-threading, the ratio is still be eight gigabytes of memory per core, or four gigabytes of memory per logical CPU. If Hyper-threading is not available, then at a minimum the server is kept at four gigabytes of memory per core. If Hyper-threading is available, then it is eight gigabytes of memory per core.

In one embodiment, both SSDs and hard drives may be used on a server. The use of two SSDs for each hard drive is a fairly aggressive ratio. Typically, one SSD spindle replaces ten hard drive spindles (a ratio of 1:10). Other desired ratios may be 1:4, 1:3 or 1:2. The actual storage capacity of each hard drive spindle is not critical. As the larger rotating media drives get full, the performance in actually finding data on the drive decreases significantly. This problem becomes more significant in a disproportionate way as the drive size increases. For example, 190 gigabytes of data on a 200 gigabyte drive can be searched faster than 900 gigabytes of data on a one terabyte drive.

It is typically desirable, for example, to have dozens of smaller disk drives because the factor that limits the I/O throughput is the I/O capacity per drive. For rotating media, the I/O capacity is proportional to the number of spindles. Using a large number of small disk drives in this fashion is in contrast to the conventional approach of aggregating this storage capacity into a single large drive.

In one embodiment, a server has at least one SSD for every processor core. Also, the physical SSD to logical SSD ratio may be, for example, either 1:1 or 2:1. They are either kept as a mirrored RAID1 pair of SSDs or a single SSD containing what are considered to be transient or temporary data.

With regard to desired memory storage capacity per processor core in one specific example, a typical relational database may have 10% of its data being actively used. Thus, for a 640 gigabyte database, 64 gigabytes of RAM is desired. So, a minimum capacity core ratio would be 1 core: 4 GB RAM: 40 GB disk space for handling this relational database workload. To further explain these ranges, when the data is 100% active, then effectively up 100% of memory usage is desired. When the data is 0% active, then only on-disk storage is needed. Cloud control system 108 may dynamically modulate resources across these three states, and overlay customers having different demand needs at differing, unpredictable times. For example, considering CPUs, a two socket server with four cores per socket, with Hyper-threading on 16 logical CPUs is served by at least 64 gigabytes of RAM. This system should have 640 gigabytes of disk storage capacity on the server. So, if there is 64 gigabytes of RAM, there is 640 gigabytes of disk space.

Figure 3:
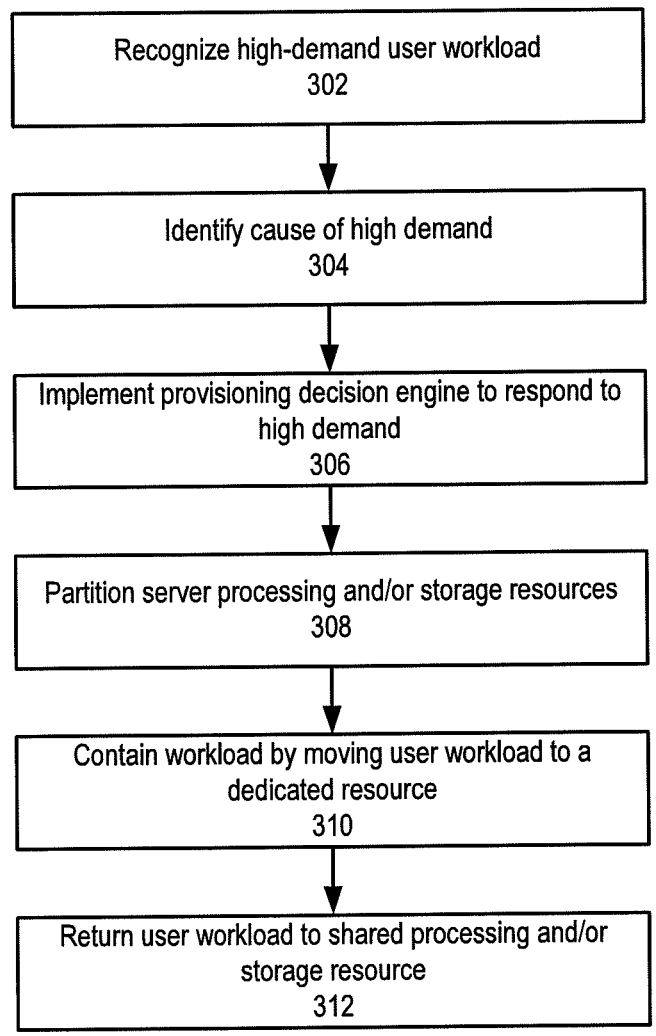
FIG. 3 shows a method to monitor and manage demand for a user workload according to one embodiment.

FIG. 3 shows a method 300 to monitor and manage demand for a user workload in cloud 100 according to one embodiment. At block 302, a high demand user workload is recognized by cloud control system 108 based on one or more messages received from utilization monitoring process 260 (and/or from messages received from other servers in cloud 100). These messages may include metrics data obtained by system calls to the kernel of the operating system 252 (for example, using DTrace).

At block 304, cloud control system 108 uses decision-making logic to identify the cause of the high demand for the user workload. At block 306, the decision-making logic implements a new provisioning for cloud 100 by sending one or more messages using a suitable messaging protocol (e.g., Extensible Messaging and Presence Protocol (XMPP) or Advance Message Queuing Protocol (AMQP)) to server 102.

At block 308, the processing, storage, or other resources of server 102 are partitioned by partitioning process 258. At block 310, the high demand workload is contained by moving it to one or more dedicated resources (for example, dedicated storage resource 284 and/or dedicated core 264).

In block 312, after the temporary need for increased resources, partitioning process 258 moves the workload back to being handled by shared hardware resources. The end of any further need for handling the high demand workload may be detected, for example, by messages sent from server 102 including metrics data showing that the demand on a processor or storage device at server 102 has returned back to a historical baseline demand for a particular customer, or the demand for the shifted workload has returned to within a predefined range of an average demand of other workloads being handled by server 102.

In one embodiment, resources are managed for a data center having many servers in a network. A request is received from each of a number of users or customers. Each user typically requests and defines specifications for one or more virtual machines, each respective virtual machine having respective minimum specifications for use of a portion of hardware resources of the data center including a minimum system memory size, a minimum processing capacity, and a minimum storage space. In response to the user request, the data center provisions the servers to provide the respective minimum specifications for each respective virtual machine. This may be done using the messaging system described herein.

During operation of the data center, a request may be detected from a first of the respective virtual machines to handle a workload requiring use of the hardware resources that exceeds at least one of its respective minimum specifications (e.g., a large database workload may require intensive access to storage devices or system memory). The data center responds by provisioning one or more of the servers as necessary or desired to provide additional hardware resources to the first respective virtual machine. The minimum specifications provided above may further include a minimum data input/output rate for the storage space, and also optionally minimums for network I/O and memory I/O.

In one embodiment, when a high demand workload is detected, to provision processor capacity, moving the workload comprises specifying to an operating system of a first server that processing for the workload is to be changed from the shared processor core to the dedicated processor core. As discussed herein, a process on each server may, for example, monitor utilization of system resources on the respective server to provide utilization data, and provisioning to provide the additional hardware resources is performed at least in part based on the utilization data. This provisioning may be limited as necessary in order to maintain the minimum specifications for the virtual machines of other users in the data center.

In one embodiment, when a user initially requests a virtual machine, the data center identifies storage devices of each of the plurality of servers that are available for use by the data center. The servers are provisioned to provide the additional hardware resources by allocating, for example, available storage devices to the virtual machine.

Each user may, for example, be provided a common API for operation of its respective virtual machine. One or more calls may be received from the API, with the call being directed, via the data center, to a process already running in a virtual machine of the user.

In one embodiment, each user is provided a report regarding usage by its virtual machine of the hardware resources. After providing the report, the data center may receive a request from the user to upgrade its respective minimum specifications for its virtual machine. The data center then provisions the plurality of servers to provide the upgraded respective minimum specifications per the user's request. The user report may also include a suggestion for an upgrade to the respective minimum specifications for the first virtual machine based on the reported usage.

A user's virtual machine(s) may be controlled through a user interface provided to the user. Also, subsequent to provisioning to provide the additional hardware resources to a user's virtual machine, the data center may receive upgraded minimum specifications from the user. The data center then provisions the servers to provide the upgraded minimum specifications. Also, the user may, for example, otherwise customize the provisioning for its virtual machine.

A system for the dynamic allocation of cloud services resources is described in United States Patent Application Publication US 2008/0080396, published Apr. 3, 2008 (titled "MARKETPLACE FOR CLOUD SERVICES RESOURCES"; inventors Meijer et al.; assignee Microsoft Corporation; application Ser. No. 11/613,906, filed Dec. 20, 2006), which is hereby incorporated by reference in its entirety.

Figure 4:
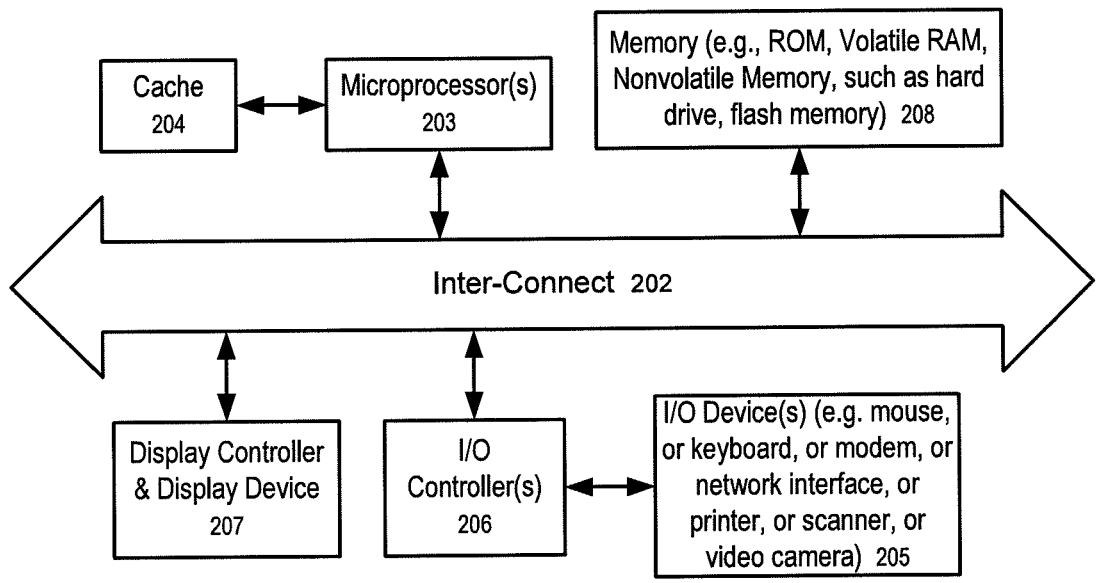
FIG. 4 shows a block diagram of a data processing system which can be used in various embodiments.

FIG. 4 shows a block diagram of a data processing system which can be used in various embodiments. While FIG. 4 illustrates various components of a computer system or computing device, it is not intended to represent any particular architecture or manner of interconnecting the components. Other systems that have fewer or more components may also be used.

In FIG. 4, the system (201) includes an inter-connect (202) (e.g., bus and system core logic), which interconnects a microprocessor(s) (203) and memory (208). The microprocessor (203) is coupled to cache memory (204) in the example of FIG. 4.

The inter-connect (202) interconnects the microprocessor(s) (203) and the memory (208) together and also interconnects them to a display controller and display device (207) and to peripheral devices such as input/output (I/O) devices (205) through an input/output controller(s) (206). Typical I/O devices include mice, keyboards, modems, network interfaces, printers, scanners, video cameras and other devices which are well known in the art.

The inter-connect (202) may include one or more buses connected to one another through various bridges, controllers and/or adapters. In one embodiment the I/O controller (206) includes a USB (Universal Serial Bus) adapter for controlling USB peripherals, and/or an IEEE-1394 bus adapter for controlling IEEE-1394 peripherals.

The memory (208) may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, a data processing system as illustrated in FIG. 4 is used to implement a server in the data center above.

In one embodiment, a data processing system as illustrated in FIG. 4 is used to implement a user terminal, which may provide an Application Program Interface to a cloud customer. A user terminal may be in the form of a personal digital assistant (PDA), a cellular phone, a notebook computer or a personal desktop computer.

In some embodiments, one or more servers of the system can be replaced with a network of distributed computing systems. The distributed computing system can be collectively viewed as a server data processing system.

Embodiments of the disclosure can be implemented via the microprocessor(s) (203) and/or the memory (208). For example, the functionalities described can be partially implemented via hardware logic in the microprocessor(s) (203) and partially using the instructions stored in the memory (208).

Some embodiments are implemented using the microprocessor(s) (203) without additional instructions stored in the memory (208). Some embodiments are implemented using the instructions stored in the memory (208) for execution by one or more general purpose microprocessor(s) (203). Thus, the disclosure is not limited to a specific configuration of hardware and/or software.

Additional exemplary networked and distributed computing environments, and an exemplary computing device, are described in United States Patent Application Publication US 2009/0092124, published Apr. 9, 2009 (titled "NETWORK ROUTING OF ENDPOINTS TO CONTENT BASED ON CONTENT SWARMS"; inventors Singhal et al.; assignee Microsoft Corporation; application Ser. No. 11/866,811, filed Oct. 3, 2007), which is hereby incorporated by reference in its entirety.

Figure 5:
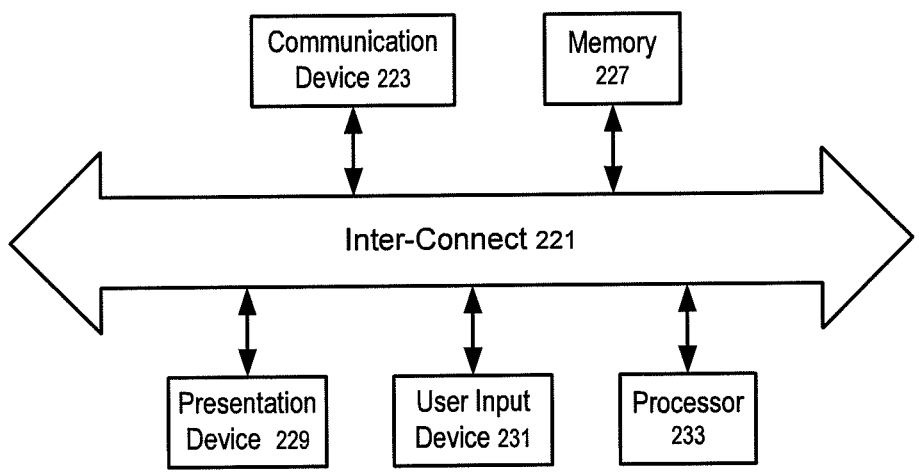
FIG. 5 shows a block diagram of a user device according to one embodiment.

FIG. 5 shows a block diagram of a user device according to one embodiment. In FIG. 5, the user device includes an interconnect (221) connecting the presentation device (229), user input device (231), a processor (233), a memory (227), and a communication device (223). The communication device (223) is configured to communicate with telecommunications network. The user input device (231) may include a text input device, a still image camera, a video camera, and/or a sound recorder, etc.

Figure 6:
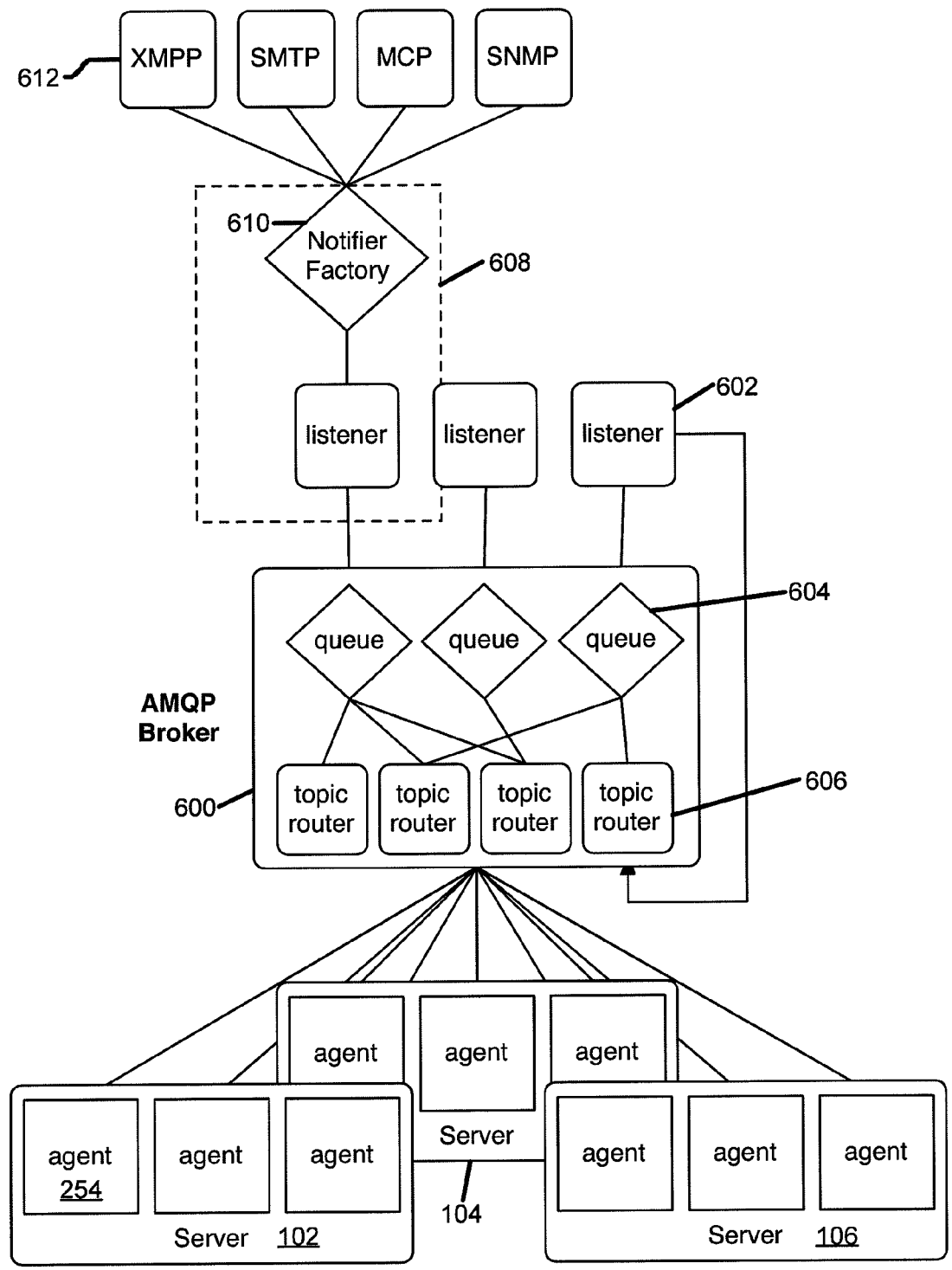
FIG. 6 shows a messaging system architecture for the data center of FIG. 1 according to one embodiment.

FIG. 6 shows a messaging system architecture for data center 100 according to one embodiment. The messaging system architecture generally includes one or more messaging systems for sending and receiving messages to and from servers in cloud 100 (e.g., brokering the sending and receiving of these messages). In this embodiment, the architecture is a hub-and-spoke, distributed message queue system. Messages from cloud control system 108 and the servers are brokered, for example, by an AMQP broker.

In FIG. 6, an AMQP messaging system 600 communicates with each of servers 102, 104, and 106. Agents 254 and other agents on servers 102, 104, 106 and/or other servers in cloud 100 send and receive messages to the AMQP broker. Messages received by the AMQP broker each have an associated topic.

The topic association may be made by an agent at a server when sending the message. In one embodiment, the topics available for this association are predefined and stored in cloud 100 within cloud control system 108 and on one or more servers. The topics may be further arranged into a topic hierarchy so that listeners 602 may operate to detect messages within a given portion of the hierarchy. In one embodiment, the topic hierarchy is initially defined for operation of the system. After a period of time in which various topics are examined in messages received by cloud control system 108, the topic hierarchy may be updated or changed to reflect the actual type and number of topics received during operation.

The AMQP broker includes one or more topic routers 606 that sort and route these messages into one or more queues 604 depending on the topic. In one embodiment, there is a queue for each topic router. One or more listener processes 602 (sometimes simply referred to herein as a "listener") are running in messaging system 600 and monitor incoming messages to detect messages having a particular topic(s). In one embodiment, each listener 602 has a corresponding different queue 604. In one embodiment, each of one or more queues 604 is stored on a different one of the servers in cloud 100, and the predefined topics for queues 604 are stored as a predefined topic hierarchy on two or more of the plurality of servers.

In general, one or more decision engines 608 use decision-making logic to determine how to handle messages received by cloud control system 108. In this embodiment, a decision engine 608 is associated with each listener process 602. Decision engine 608 uses decision-making logic represented in FIG. 6 as a "Notifier Factory" 610. Notifier factory 610 may, for example, include a number of rules to determine subsequent tasks and/or messages to be launched based on a particular message that is received by its corresponding listener 602. For example, notifier factory 610 may send a new message having a type selected from one of a predefined set of message types 612 (for example, messages implemented by XMPP, Simple Mail Transfer Protocol (SMTP), or Simple Network Management Protocol (SNMP)). The message type "MCP" indicated in FIG. 6 designates an API that may be customized for cloud control system 108 to implement all system interactions in a RESTful API.

In one embodiment, a dedicated agent is executed on each server in cloud 100, and each respective agent listens for a dedicated one or more topics from the topic hierarchy. Each dedicated agent sends a stream of messages to cloud control system 108 to update the network regarding the operation of the respective server from which the stream of messages is being sent. The stream of messages is pushed to cloud control system 108, and the stream may be sent periodically. Alternatively, other events may trigger the sending of the messages.

In one embodiment, agents can communicate presence over a chatting protocol (XMPP) and commands over AMQP. When the agents are to execute commands, the agents are instructed as to the commands to locally execute, and the data to collect and then send out to the data bus. For example, an agent that collects metric information can reach into kernel stats of the operating system on a server or trace anything with DTrace with its set of executed commands (DTrace is a comprehensive dynamic tracing framework created by Sun Microsystems for troubleshooting kernel and application problems in real time. DTrace permits inspection of various elements of the kernel and userland at run-time).

Thus, the agent can find out how many system calls the workload is making The agent is a process and is capable of firing up other processes. It is also possible to achieve versioning of agents. A prior version of a process can be terminated once a task is complete. The metrics collected by the agents are sent, for example, to a central cloud control server.

In another embodiment, as a specific example, a typical instruction in a message from cloud control system 108 (e.g., initiated from notifier factory 610) to a server is in a JSON or XML format (other formats may be used in other embodiments) and everything has a base URL, for example, as follows:

https://api.joyent.com/mcp/<version>/path-that-denotes-an-action

In one embodiment, the HTTP methods GET, PUT, and POST may be used in a RESTful fashion on the API gateway, for example, as in the following:

```
- Show Action
    - Path: /customers/:customer_id
    - HTTP Method: GET
    - Parameters: customer.id
    - Success HTTP Code: 200 OK
    - Response Body:
        - <?xml version="1.0" encoding="UTF-8"?>
        <customer>
            <id>Integer</id>
            <email_address>somebody@example.com
<mailto:somebody@example.com> somebody@example.com
<mailto:somebody@example.com></email_address>
            <alternate_email_address></alternate_email_address>
```

-continued

```
            <company_name></company_name>
            <street_1></street_1>
            <street_2></street_2>
            <city></city>
            <state></state>
            <postal_code></postal_code>
            <country></country>
            <phone_number></phone_number>
            <updated_at>YYYY-MM-DD HH:ii:SS</updated_at>
        </customer>
```

Some commands such as the above may only elicit a response from cloud control system 108, while others such as the following must be led to a command executed on a specific machine by, in this case, the "reboot agent":

Reboot Action
    HTTP Method: PUT
    Optionally, allow method override with POST+ "_method=put" param
    Path: /customers/:customer_id/accelerators/:accelerator_id/reboot
    Parameters: N/A
    Request Body: N/A
    Success HTTP Code: 200 OK
    Response Body: N/A
    Notes: Only active zones can be rebooted This restriction of machine agents to a specific task is implemented in the messaging system of cloud control system 108. The API gateway translates this into a message in XML or JSON that is carried out by an agent on a specific machine (e.g., a server in the cloud) into a new message still in XML or JSON format. This new message contains that identifying information and directives called in the API gateway along with the specific actions to be carried out. The new message is then pushed to an agent on the machine similarly, for example, as a Blackberry device pushes email. The new message is consumed, and the action is carried out by the agent. The agent generates a success or failure message, pushes this message into the message bus where it is consumed by cloud control system 108, and the result is noted and recorded (e.g., in data store 120).

In one embodiment, any given message may cause an action or task to be implemented or occur on more than one server or component in cloud 100. For example, as a message is distributed, there could be 10 or 15 different components reacting to the message in one way or another.

Figure 7:
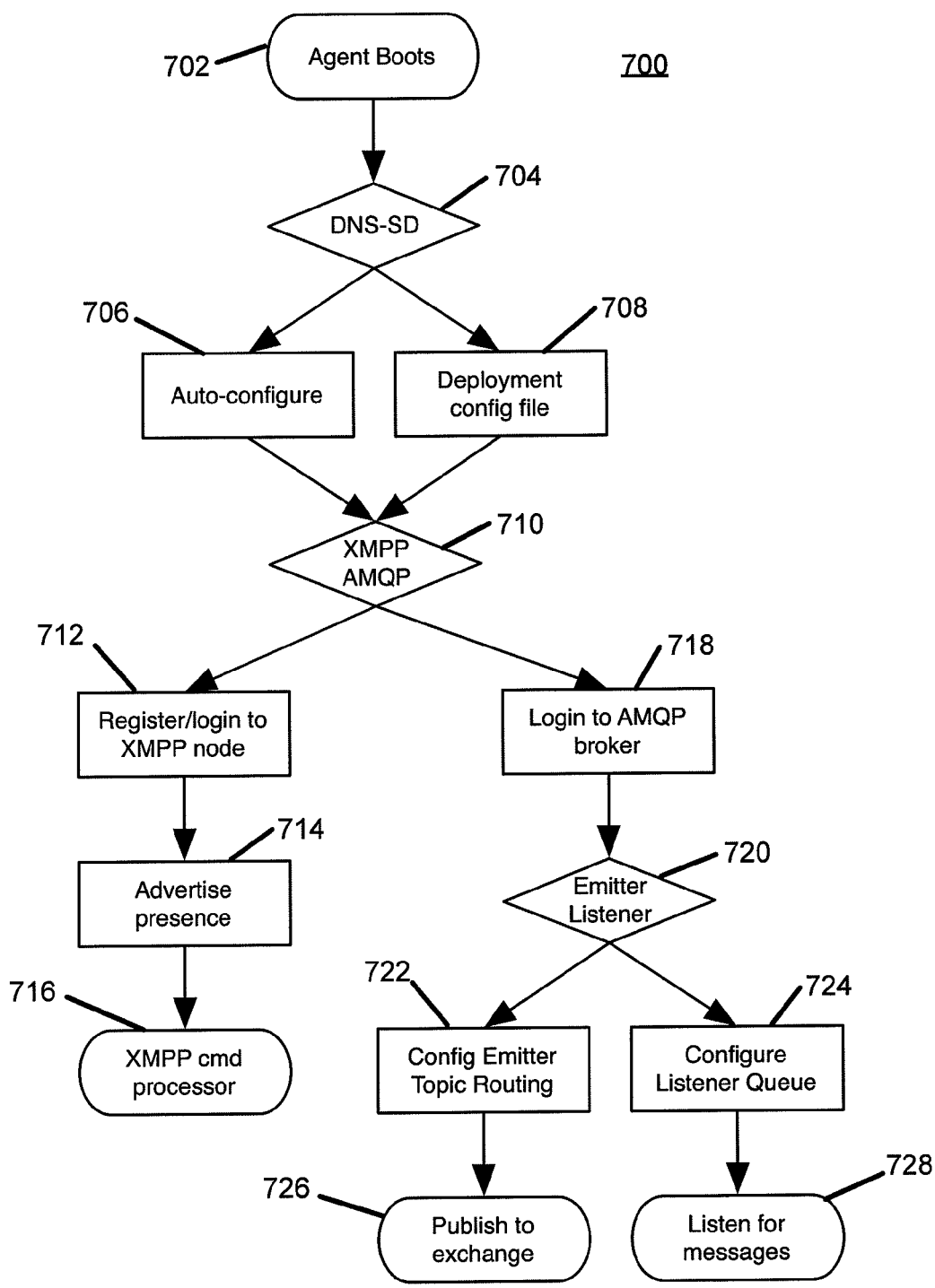
FIG. 7 shows a process for initiating a new agent on a server in the data center of FIG. 1 according to one embodiment.

FIG. 7 shows a process 700 for initiating a new agent on server 102 in data center 100 according to one embodiment. A new agent may be initiated, for example, when a new server is being added to the network of cloud 100 or when a given resource needs to be segmented and scaled for security and use demands.

At block 702, the new agent boots on server 102. This may be in response to server 102 newly joining the network. At block 704, the new agent does service discovery (for example, DNS-SD) to look for services that are available to the new agent in cloud 100. At block 706, the agent does an auto-configuration, and at block 708, the agent deploys a configuration file.

As part of initiation process 700, at block 710, one or more new agents are launched, each for a different messaging system that may be used in cloud control system 108. In this embodiment, one new agent is launched for an XMPP messaging system and one new agent for AMQP messaging system 600.

At block 712, the new XMPP agent logs in to the XMPP system, and at block 714, the agent advertises its presence to cloud control system 108. In this embodiment, cloud control system 108 runs an XMPP messaging process. At block 716, the new XMPP agent launches an XMPP command processor.

At block 718, the new AMQP agent logs into AMQP broker 600, and at block 720, launches an emitter agent and a listener agent. At block 722, the emitter agent is configured to handle topic routing of messages from server 102, and at block 726, the new agent publishes these messages to messaging system 600. At block 724, the new listener agent configures a listener queue and, at block 728, listens for new messages received from AMQP messaging system 600. The listener queue listens and then queues messages, and then the AMQP broker takes what is queued and does an appropriate directing of it.

In one embodiment, a first new agent is initiated on a new server in which the first new agent discover services in the network available to the first new agent. The first new agent self-configures in response to the services discovered. The first new agent launches a second new agent that logs into a first messaging system (e.g., XMPP) to advertise a presence of the new server, and also launches a third new agent that logs into a second messaging system (e.g., AMQP). The third new agent implements and manages a listener queue on the new server, publishes messages to the second messaging system, and listens for new messages in the listener queue.

In one embodiment of the initial provisioning of a server (e.g., in order to become part of a higher-level modular network unit), an initial or new agent boots, does a zero-conf service discovery (DNS-SD), and then is auto-configured and sent a deployment configuration file. This is used to log into and make one's presence known to the AMQP/XMPP message busses. Using XMPP, the active server then advertises state and presence. Then, the server logs into the AMQP broker, begins to listen for messages that contain commands, and begins to publish its information to the message system exchange.

Figure 8:
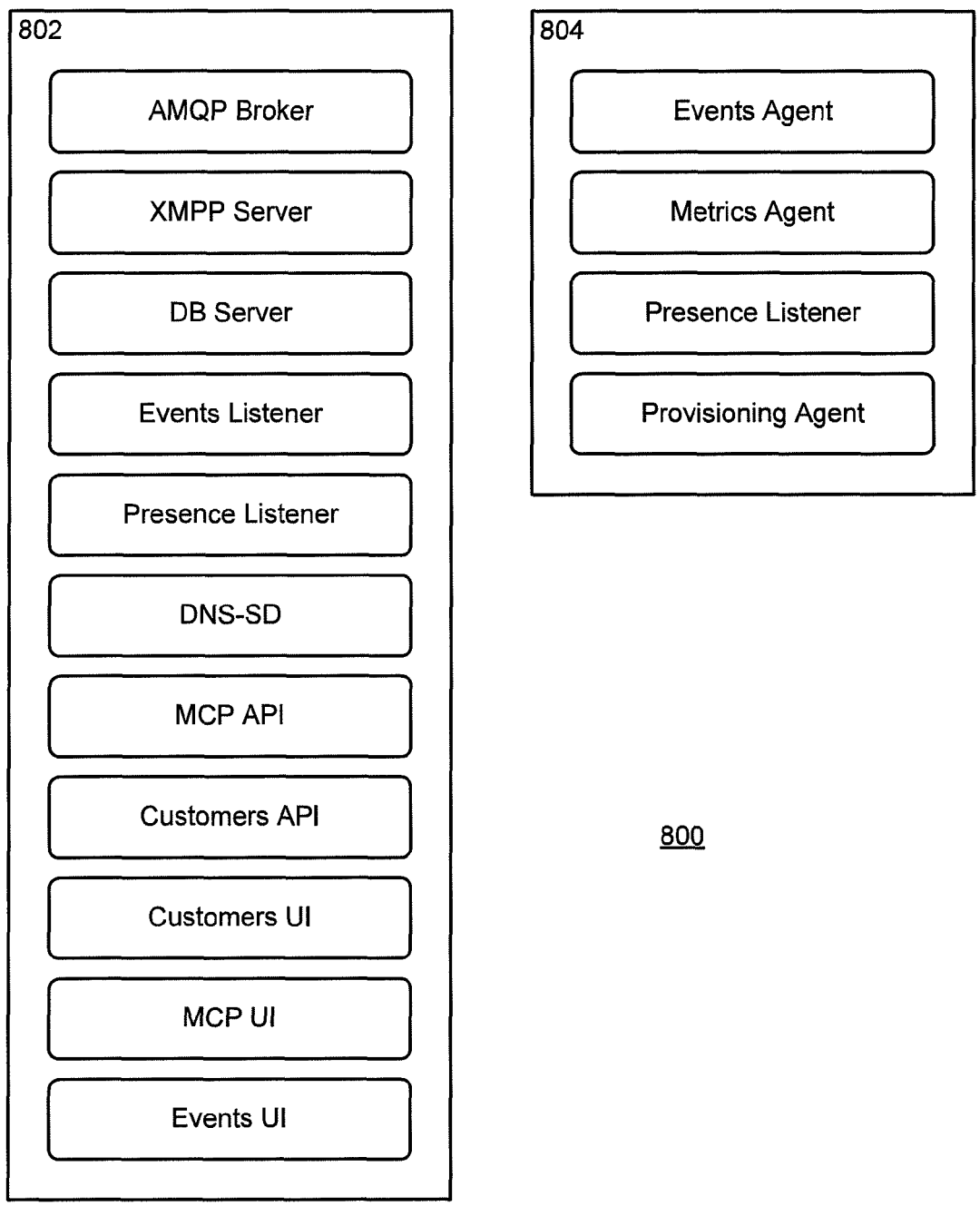
FIG. 8 shows base services for the cloud control system of the data center of FIG. 1 according to one embodiment.

FIG. 8 shows certain base services 800 available in cloud control system 108 according to one embodiment. Client agents 804 (for example, a presence listener or metrics agent) run on server 102 (and also, for example, on the other servers in cloud 100).

The metrics agent obtains metrics data for the hardware resource capacity and input/output usage by a server. The provisioning agent listens for messages related to a provisioning topic and then implements partitioning on a server (as described for partitioning process 258 above) as may be commanded by a message.

The presence listener is used to relay the presences and availability of a system. The events agent is used to regulate events by all actions performed on a system.

Cloud control system 108 includes one or more of various services 802, and some of these services may be discovered by a new agent when instantiated. In one embodiment, the database (DB) server(s) may be used to store information for data store 120 (e.g., to keep the state of nodes in the network).

The events listener and presence listener are, for example, two of listener processes 602. The events listener detects events that may trigger an analysis by one or more of a decision engine 608. Listeners 602 may listen for certain topics, and then determine if an event related to that topic has occurred in cloud 100.

The XMPP server supports the XMPP messaging system used for certain of the embodiments discussed above. The presence listener is used to relay the presences and availability of a system. The MCP API and MCP UI indicate an API and user interface to a customized API as discussed above and are used to coordinate and present all provisioning and system tracking information.

The customers API and UI are used to coordinate and present all information around resources to customers. The events UI is used to present all events and metrics to end users. The DNS-SD service is used by agents to auto-discover available resources and services.

In exemplary embodiments, when a virtual machine is provisioned, it runs on a single physical machine. There are multiple virtual machines running on each physical machine. Any given virtual machine only runs on one physical machine. The cloud control system may be installed on a single machine dedicated to cloud control. Alternatively, the cloud control system can be provisioned within the same virtual machines, and the collection of services can be installed throughout the infrastructure so that cloud control is a distributed set of services.

For example, a virtual machine is to be provisioned somewhere in the data center. A message indicating this created and dropped into the outgoing message queue. Cloud control system 108 is provided a size of memory by the API, and then makes a decision on where that memory is available in cloud 100. The new virtual machine will be placed there. The AMQP messaging system is used to look for a machine that has the necessary gigabytes of RAM to implement one or more various specifications (e.g., minimum ratio) as described above. Then, XMPP is used to talk to that particular server. This tells the server to start provisioning, and then to have the server respond with a new message to report when it is done.

Now discussing a specific example of a customer's virtual machine (VM), there are two aspects to the VM. One aspect is the presentation the VM takes to the customer. The other aspect is the presentation the VM takes to the cloud operator. From the customer's perspective, the VM appears like any other Solaris machine. To the operator the VM appears like a separate set of processes running under an installation of Solaris. In Solaris, every process in the system may be tagged. For example, one process may be tagged for Zone A and another process tagged for Zone B. The processes can be set up so that they do not interact with processes in a different zone. A zone refers to an arbitrary virtual machine. Zone A, for example, would be a virtual machine A running underneath a real machine. Each zone has a one-to-one relationship with a customer (which in some circumstances could be the same customer).

In one specific example of shifting of storage, ZFS is used to shift file systems. ZFS takes a snapshot of a file system that an operator can see at any given moment. Having a snapshot of a file system permits sending it to other machines (each machine is running the ZFS process). Using a previous snapshot, the incremental change that has occurred in the file system can be determined so that moving the file system snapshot requires a smaller data transfer.

The snapshot provides the state of the file system (e.g., files, size, hierarchy, and data). Each customer is running a virtual machine having this same ZFS file system. Once the copy of a customer's virtual machine has been copied to another machine, the virtual machine can next be moved to the new machine more readily. Another snapshot is taken, and then an incremental copy is done to update the snapshot on the new machine to complete the transfer. Finally, the customer's virtual machine is restarted on the new machine.

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using an Application-Specific Integrated Circuit (ASIC) or a Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others.

In general, a machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:
   monitoring, by a cloud control system, a plurality of workloads being handled by a plurality of servers in a cloud, each workload being initiated based on a request by a virtual machine, each server providing one or more shared hardware resources, and each workload using one or more dedicated hardware resources, wherein each workload is allocated to the one or more hardware resources;
   detecting, by the cloud control system, a high demand placed by a first workload of the plurality of workloads upon a first server of the plurality of servers, wherein the high demand is greater than an average demand of other workloads being handled by the first server, and wherein the first workload is using a first shared hardware resource of the first server; and
   based on detecting the high demand, moving the first workload of the first server from the first shared hardware resource to at least one dedicated hardware resource of the first server,
   wherein the at least one dedicated hardware resource of the first server is only used by resources that are moved responsive to the detecting of high demand.

2. The method of claim 1, wherein each respective server of the plurality of servers comprises:
   at least one physical processor providing a plurality of logical processors, the logical processors including a shared logical processor and a dedicated logical processor, and the dedicated logical processor configured to operate as the dedicated hardware resource;
   system memory coupled for access by each of the logical processors, the system memory comprising at least four gigabytes of memory for each logical processor; and
   a storage device configured to operate as the dedicated hardware resource.

3. The method of claim 1, wherein each respective server of the plurality of servers comprises:

at least one physical processor providing four or more processing cores, each core using simultaneous multi-threading;

system memory coupled for access by each of the processing cores, the system memory comprising at least eight gigabytes of memory for each processing core;

at least one hard disk drive (HDD) having an HDD total storage capacity, at least a portion of the HDD configured to provide a shared storage resource; and at least one solid state drive (SSD) having an SSD total storage capacity, at least a portion of the SSD configured to provide a dedicated storage resource, and wherein the SSD capacity is at least 35 percent of the HDD capacity;

wherein a total memory size of the system memory is at least ten percent of the combined HDD capacity and SSD capacity.

4. The method of claim 1, wherein each respective server of the plurality of servers comprises:

at least one physical processor providing four or more processing cores;

system memory coupled for access by each of the processing cores, the system memory comprising at least four gigabytes of memory for each processing core; and at least one solid state drive (SSD), at least a portion of the SSD configured to provide the dedicated storage resource, and wherein each SSD has a data input/output rate of at least ten megabytes per second for each gigabyte of system memory.

5. The method of claim 2, wherein:

each respective server further comprises a hard disk drive to provide its respective one or more shared hardware resources; and the storage device is a solid state drive (SSD), the SSD including at least five logical drives configured to shift back-and-forth between operation as a shared resource or as a dedicated resource as requested during operation of the cloud.

6. The method of claim 2, wherein the storage device has a data input/output rate of at least ten megabytes per second for each gigabyte of system memory.

7. The method of claim 6, wherein the storage device is a solid state drive (SSD), and each server further comprises at least one hard disk drive coupled for read/write access by at least one of the logical processors.

8. The method of claim 1, wherein:

the cloud control system is in communication with the plurality of servers;

monitoring the plurality of workloads comprises executing an agent on each of the plurality of servers, each agent including a process that monitors utilization of system resources on the respective server and that reports server utilization data to the cloud control system; and moving the first workload is performed at least in part based on an economic model stored at the cloud control system and based on an analysis of server resource data and historical user data by the cloud control system, the economic model associating a cost with at least one hardware resource.

9. The method of claim 1, wherein:

the cloud control system is one of the plurality of servers; and monitoring the plurality of workloads comprises executing an agent on each of the plurality of servers, each agent including a process that monitors utilization of system resources on the respective server.

10. The method of claim 1, wherein the high demand is characterized by use of a data input/output rate for a storage device of the first server, or by a processing load on a logical processor of the first server.

11. The method of claim 1, wherein each of the shared hardware resources is a processor or a storage device, and the high demand is characterized by a processing load on the processor or by use of a data input/output rate for the storage device.

12. The method of claim 11, wherein the first shared hardware resource is a shared core of a processor of the first server, and the dedicated hardware resource is a dedicated core of a processor of the first server.

13. The method of claim 12, wherein the processor is a single physical processor comprising the shared core and the dedicated core.

14. The method of claim 11, wherein the first shared hardware resource is a shared storage area of a storage device of the first server, and the dedicated hardware resource is a dedicated storage area of a storage device of the first server.

15. The method of claim 1, further comprising:

executing a monitoring process on the first server;

wherein monitoring the plurality of workloads comprises monitoring the first workload using the monitoring process.

16. The method of claim 15, further comprising storing server data regarding the plurality of servers in a data store coupled to a cloud control system, the server data including data received from the monitoring process, wherein the cloud control system is coupled to send messages to the first server, and wherein moving the first workload is performed at least in part based on the server data.

17. The method of claim 1, further comprising:

detecting, via the cloud control system, an end of the high demand placed by the first workload upon the first server, wherein the end of the high demand is within a predefined range of the average demand of the other workloads being handled by the first server; and in response to detecting the end of the high demand, moving the first workload from the dedicated hardware resource to the first shared hardware resource.

18. A method for managing resources in a data center, the data center comprising a plurality of servers in a network, the plurality of servers comprising hardware resources for use by the data center, each respective server using a file system for file storage on the respective server, the method comprising:

providing, via the data center, a virtual machine for each of a plurality of users, each respective virtual machine to use a portion of the hardware resources of the data center, and wherein the hardware resources include storage resources distributed onto each of the plurality of servers;

monitoring, via an agent executing on each of the plurality of servers, a plurality of workloads being handled by each respective server, each workload being initiated based on a request by one of the virtual machines, each workload using one or more dedicated hardware resources, wherein each workload is allocated to the one or more hardware resources;

identifying, via an agent, a first workload requiring increased use of a storage resource of the hardware resources; and provisioning the plurality of servers to temporarily allocate additional storage resources from the hardware resources to the first workload, the provisioning comprising moving the first workload of the plurality of servers from a shared storage resource to at least one dedicated storage resource of a first server of the plurality of servers, wherein moving the first workload comprises specifying to the file system of the first server that data storage for the first workload is to be handled by the dedicated storage resource, wherein the at least one dedicated storage resource of the first server is only used by resources that are moved responsive to the identification of increased use.

19. The method of claim 18, wherein the first workload is being processed within a first respective virtual machine on the file system, and further comprising programming the file system of the first server from an application program interface (API) running on a computing device of one of the plurality of users.

20. The method of claim 18, wherein:
the shared storage resource is a first pool under the file system within which a plurality of virtual machines of other of the plurality of users are running; and
the dedicated storage resource is a second pool under the file system;
wherein the second pool stores at least a portion of files associated with the first workload prior to moving the first workload to the dedicated storage resource.

21. The method of claim 20, wherein the first pool comprises at least four drives in a RAID configuration, the second pool comprises at least two drives, and the second pool is operating as a mirror of the first pool.

22. The method of claim 18, wherein an agent on one of the plurality of servers identifies an increased demand of the first workload upon the shared storage resource.

23. The method of claim 18, wherein the file system comprises a combined file system and logical volume manager that implements snapshots.

24. A data center comprising:
a plurality of servers in a network;
each of the plurality of servers providing a virtual machine for each of a plurality of users, each respective virtual machine to use a portion of hardware resources of the data center, and wherein the hardware resources include storage and processing resources distributed onto each of the plurality of servers;
the plurality of servers communicating with one another via messages, at least a portion of the messages being sent from any respective server comprising status information regarding a hardware resource utilization status of that respective server;
each of the plurality of servers being configured to receive a request from a first of the respective virtual machines to handle a workload requiring increased use of the hardware resources, each workload associated with a virtual machine of one of the plurality of users and using one or more dedicated hardware resources, wherein each workload is allocated to the one or more hardware resources; and
the plurality of servers temporarily allocating additional resources from the hardware resources to the first respective virtual machine, the allocating based at least in part on status information provided by one or more of the messages, the allocating comprising moving the first workload of the plurality of servers from a shared storage resource to at least one dedicated storage resource of a first server of the plurality of servers, wherein moving the first workload comprises specifying to the file system of the first server that data storage for the first workload is to be handled by the dedicated storage resource,
wherein the at least one dedicated additional resource is only used by resources that are moved responsive to status information indicating increased use.

\* \* \* \* \*